United States Patent Office 3,553,224
Patented Jan. 5, 1971

3,553,224
1(2H)-PYRIDINE-SULFONATES
John Valdemar Brammer Petersen, Horsholm, and Neils Clayson-Kaas, Farum, Denmark, assignors to Geigy Chemical Corporation, Ardsley, N.Y., a corporation of New York
No Drawing. Original application Apr. 25, 1966, Ser. No. 544,685, now Patent No. 3,419,570. Divided and this application June 25, 1968, Ser. No. 751,650
Claims priority, application Switzerland, Apr. 29, 1965, 5,938/65, 5,939/65, 5,940/65
Int. Cl. C07d 29/42
U.S. Cl. 260—294.8  3 Claims

ABSTRACT OF THE DISCLOSURE

3 - hydroxy-2-oxo- and 3-hydroxy-2-imino-1(2H)-pyridine-sulfonic acid salts are disclosed. The compounds are inermediates in the preparation of 2,3-pyridinediol.

This application is a division of our eariler application Ser. No. 544,685, filed Apr. 25, 1966, now U.S. Pat. No. 3,419,570.

This invention relates to novel processes for the production of pyridine derivatives and, in its first and second aspect, more particularly to novel processes for the production of 2,3-pyridine-diol.

According to a first aspect of the invention, it has surprisingly been found that 2,3-pyridinediol can be produced by a first novel process from an easily accessible starting material, namely, furfural, by reacting the latter in an aqueous medium in any order desired, optionally with the addition of catalysts, with a chlorinating agent affording, per mole of furfural, 1 to 1.5 times the molar amount of chlorine, preferably with gaseous chlorine or with a corresponding amount of an agent giving off chlorine and with at least the equimolar amount of ammonia or of an ammonium salt. The reaction of chlorine on furfural or on the reaction product formed from furfural and ammonia is preferably performed at a pH below 6; while the reaction of ammonia and furfural or on the reaction product formed from furfural and chlorine is preferably performed at a pH above 3, the reaction of furfural/chlorine reaction product with ammonia being carried out optionally at a pH of from 7 to 9.

Preferably the pH of the resulting reaction mixture is then adjusted to within a range of from 2 to 6, e.g. by addition of a mineral acid such as hydrochloric acid, thereby neutralizing the reaction product therein. 2,3-pyridinediol is then recovered, preferably by extraction with diethyl ether.

Although water by itself is a good reaction medium, the use, particularly with high concentration of the reaction components of a mixture of water and a solvent miscible therewith is recommended. Examples of such solvents are methanol, ethanol, propanol, isopropanol, tert. butanol, methoxyethanol, ethoxyethanol, n-butoxyethanol, formamide, dimethyl formamide, acetic acid, propionic acid or dioxan.

Ammonia can be used in the liquid state or as gas, as ammonium hydroxide or in the form of an ammonium salt such as, e.g. ammonium chloride, ammonium sulfate, ammonium carbonate or ammonium acetate. If the first phase of the reaction is performed with chlorine or a substance giving off chlorine and furfural, then ammonia can be used for the neutralization, i.e. for the adjustment of the strongly acid reaction mixture to the pH necessary for the second phase of the reaction, so that a solution of an ammonium salt, e.g. of ammonium chloride, is obtained. The addition of further ammonium chloride immediately before or after neutralization is particularly advantageous.

The chlorine can be used in the gaseous state or in the form of a substance giving off chlorine such as, e.g. sodium hypochlorite in equimolar amount.

Examples of suitable catalysts are inorganic bromides and iodides as well as other inorganic compounds such as molybdenum compounds. Experience has shown that they can increase the yields in oxidations with halogens.

The pH desired at any time during the reaction can be adjusted, provided it has not already been attained by the reaction partners and reaction products, by the addition of compounds having a basic or acid reaction. Suitable basic compounds are ammonia, hydroxides, carbonates or acetates of the alkali metals and alkaline earth metals. Suitable acid compounds are hydrochloric acid, sulphuric acid and acid sulphates as well as organic acids such as acetic acid.

The reaction partners can be mixed simultaneously, i.e. by adding ammonia and chlorine, or the substances containing them mentioned above, to a solution of furfural in the suitable solvent.

It is also possible, however, first to add chlorine to an acid furfural solution and then to add ammonia and, if necessary additional ammonium chloride, to the reaction solution or the reaction solution of furfural and chlorine can be added dropwise to a solution of ammonium chloride and ammonia. On the other hand, first ammonia can be mixed with chlorine and then furfural added, in which case ammonia and chlorine are used as such or in the form of ammonium salts or of substances giving off chlorine described above, respectively.

The reaction temperature, which depends on the reaction conditions, can vary between —80° and 100°. However, the preferred temperature range lies between —10° and 50°.

All temperatures stated in this specification and the appended claims are given in degrees centigrade, and all percentages are by weight unless expressly stated otherwise.

The intermediate steps between furfural and the 2,3-pyridinediol formed as end product vary depending on the reaction conditions and the type of reactants used, but in every case 2,3-pyridinediol is finally formed.

The following non-limitative examples illustrate the first aspect of the invention.

EXAMPLE 1

57 ml. of sodium hypochlorite solution (containing 12.5 g. of active chlorine per 100 ml., 0.10 mol) are added dropwise at 0° within 15 minutes while stirring to a solution of 9.6 g. of furfural (0.10 mol) and 0.5 g. of potassium iodide in 150 ml. of 1 N hydrochloric acid. After leaving to stand for 10 minutes, about 1 g of sodium thiosulphate is added to decompose traces of active halogen. The pH of the solution is quickly brought to 8–9 by the dropwise addition of concentrated ammonium hydroxide solution and this pH is maintained for about 30 minutes. The addition of ammonium hydroxide causes the temperature of the reaction mixture to rise to 25–30°. After heating for a short time at 95° the reaction mixture is again brought to room temperature and the pH is adjusted to 2 by the addition of 15–20 g. of sodium hydrogen sulphate, and the mixture is continually extracted with diethyl ether. After evaporation of the diethyl ether, 5.9 g. (53% of the theoretical) of 2,3-pyridinediol is obtained; M.P. 251–253°.

EXAMPLE 2

65 ml. (corresponding to 0.105 mol) of a sodium hypochlorite solution (containing 11.5 g. of active chlorine in 100 ml.) is added dropwise at 0° within 15 minutes, while stirring and cooling, to a solution of 9.6 g. (0.10 mol) of furfural in 150 ml. of 1 N hydrochloric acid. The reaction solution formed is added dropwise within 1 hour while stirring to a mixture of 50 ml. of diethyl ether and a solution of 25 g. of ammonium chloride in 70 ml. of water. During the addition, the pH of the reaction mixture is always kept at 7.5 by the addition of concentrated aqueous ammonia solution. The reaction mixture is then continually extracted with diethyl ether whereupon 7.8 g. of crude 2,3-pyridinediol is obtained as a brown powder. By sublimation at 150° and 0.1 mm. pressure and rubbing in a mortar, 7.7 g. of 2,3-pyridinediol are obtained (yield 69% of the theoretical). It is spectroscopically pure (IR in KBr) and almost white.

EXAMPLE 3

(a) 71.0 g. of chlorine (=42. ml., measured at −80°, 1.00 mol) are introduced through a cylindrical sintering glass tube within 30 minutes while stirring well at 0° to a suspension of 96.1 g. (1.00 mol) of furfural in 700 ml. of water. During the reaction the furfural dissolves and at the same time a slight amount (about 5 g.) of an oily substance separates out and clings to the walls of the vessel. 40% sodium hydroxide solution is then added dropwise, also while stirring at 0° until pH 2 is attained (about 200 g., 2.0 mol). The reaction mixture is decanted from the oily precipitate and diluted with water to 1000 ml. If the pale yellow solution cannot be worked up immediately, it is cooled to about −25° at which temperature it can be stored for about one day without any substantial alteration.

(b) A solution of 5.35 g. of ammonium chloride (0.10 mol) in 25 ml. of water is added, preferably immediately, to 100 ml. of the reaction solution obtained according to (a) (containing the reaction product of 0.10 mol of furfural). 40% sodium hydroxide solution is then added at 20–30° until pH 7.0 is attained and this pH is maintained for 10 minutes by further addition of sodium hydroxide solution. The total quantity of sodium hydroxide used is about 7.2 ml. (0.10 mol). The pH is then brought to 4.5 with dilute hydrochloric acid and the dark reaction mixture is continuously extracted with diethyl ether for about 15 hours. The ether extract, the volume of which should be about 60 ml., is a suspension from which 3.70 g. of crude 2,3-pyridinediol is obtained by filtration. It is in the form of a brown powder; on sublimation at 150° and 0.2 mm. pressure, 2,3-pyridinediol is obtained as white crystals, identical with the product obtained in Example 2.

EXAMPLE 4

9.62 g. of furfural (0.10 mol) are dissolved in a mixture of 70 ml. of water and 40 ml. of methanol. 7.32 g. of chlorine (0.103 mol) are then introduced within 30 minutes at 0° into the solution the pH being maintained at 2 by the addition of, in all, 38.5 ml. of 5 N sodium hydroxide solution. A solution of 6.41 g. of ammonium chloride (0.120 mol) in 20 ml. of water is poured, all at once, to this mixture, the pH of the reaction mixture is adjusted to 7.0 by further addition of 5 N sodium hydroxide solution and the reaction mixture is left to stand for 30 minutes at this pH value. The total amount of sodium hydroxide solution added is 16.2 ml.

The pH of the reaction mixture is then brought to 4 by the addition of aqueous 3 N hydrochloric acid and the dark solution so obtained is evaporated under a pressure of 20 mm. until the residual solution has a volume of about 60 ml. All the methanol is removed in this way. The residue obtained is extracted continuously overnight with diethyl ether whereupon, on evaporating the diethyl ether, 2,3-pyridinediol is obtained; yield: 2.55 g. (23% of the theoretical).

EXAMPLE 5

3.6 g. of chlorine (0.051 mol) are dissolved at 10° in 450 ml. of water. 3.0 g. of ammonium chloride (0.056 mol) are added and this dissolves immediately. A solution of 4.8 g. of furfural (0.050 mol) in 70 ml. of water is poured in and the clear solution is left to stand at room temperature for 3 hours. 12.6 g. of sodium hydrogen carbonate are added in portions, after which the reaction mixture is brought to the boil and boiled for 10 minutes in an open vessel. The reaction mixture is cooled to room temperature and the pH thereof, which is 7, adjusted to 4 by the addition of 6 N sulphuric acid. The mixture is filtered and the filtrate is continuously extracted with diethyl ether. After evaporating the diethyl ether, the residue is sublimed at 180° under 0.1 mm. and the sublimate is recrystallised from methanol whereupon 2,3-pyridinediol is obtained; yield: 5.5 g. (10% of the theoretical).

EXAMPLE 6

28 g. of chlorine (0.40 mol) are introduced at 0° within 50 minutes while stirring well into a solution of 38 g. of furfural (0.40 mol), 1 g. of ammonium molybdate, 10 g. of sodium bromide and 45 ml. of acetic acid in 250 ml. of water, the pH being kept between 1.3 and 1.7 by the addition of, in all, 70 g. of sodium acetate. 80 g. of ammonium carbonate (1.2 mol) are then added to the reaction mixture in portions at 0°, the addition being made within 15 minutes whereby carbon dioxide is evolved and the pH of the mixture rises to 5. 30 g. of sodium carbonate and 200 ml. of water are added and the mixture is stirred for 10 minutes at room temperature. A brown, flaky precipitate is removed by filtration and the pH of the filtrate is adjusted to 7–8 by the addition of 20 ml. of concentrated ammonium hydroxide solution. After standing for about 15 hours at room temperature, the pH of the reaction mixture is adjusted to 2–3 by addition of concentrated hydrochloric acid and the mixture is evaporated to dryness on a water bath (100°) under 15 mm. pressure. The residue together with 300 ml. of boiling water is poured into an extraction apparatus and continuously extracted with diethyl ether. On evaporating the diethyl ether, 2,3-pyridinediol is obtained; yield: 12.7 g. (29% of the theoretical).

EXAMPLE 7

57 ml. of a sodium hypochlorite solution (containing 12.5 g. of active chlorine per 100 ml., 0.10 mol) are added dropwise while stirring at 0° to a solution of 9.6 g. of furfural (0.10 mol) in 40 ml. of water, 10 ml. of concentrated hydrochloric acid and 10 ml. of dimethyl formamide, the addition being made within 10 minutes. The pH of the reaction mixture is adjusted to 9 at 0° by the introduction of gaseous ammonia and it is kept at 9 by the further addition of ammonia for 10 minutes. The mixture is then heated for a short time at 100°, cooled again to room temperature; the pH is adjusted to 4 with concentrated hydrochloric acid, and it is continuously extracted with diethyl ether. On evaporating the diethyl ether, 2,3-pyridinediol is obtained; yield: 1.56 g. (14% of the theoretical).

EXAMPLE 8

57 ml. of sodium hypochlorite solution (containing 12.5 g. of active chlorine per 100 ml., 0.10 mol) are added dropwise at 0° while stirring to a solution of 9.6 g. of furfural (0.10 mol) and 1 g. of sodium bromide in 40 ml. of water, 10 ml. of concentrated hydrochloric acid and 10 ml. of tert.butanol, the addition being made within 10 minutes. By introducing gaseous ammonia at 0°, the pH of the reaction mixture is adjusted to 9 and kept there for 10 minutes by the further addition of ammonia. The mixture is heated in an open vessel at 100° whereupon most of the tert.butanol evaporates. After cooling to room temperature, the pH of the reaction mixture is brought to 4 by the addition of concentrated hydrochloric acid and the mixture is continuously extracted with diethyl ether. On evaporating the diethyl ether, 2,3-pyridinediol is obtained; yield: 2.15 g. (19% of the theoretical).

EXAMPLE 9

57 ml. of sodium hypochlorite solution (containing 12.5 g. of active chlorine per 100 ml., 0.10 mol) are added dropwise at 0° while stirring to a solution of 9.6 g. of furfural (0.10 mol) and 1 g. of sodium bromide in 40 ml. of water, 10 ml. of concentrated hydrochloric acid and 10 ml. of dioxan, the addition being made within 5 minutes. The pH of the reaction mixture is adjusted to 9 by the introduction of gaseous ammonia at −10° to 0° and kept at 9 by the further addition of ammonia for 10 minutes whilst the temperature of the mixture is allowed to rise to 10°. The mixture is then heated for a short time at 40°, cooled again to room temperature, the pH is adjusted to 4 with concentrated hydrochloric acid and the mixture is heated in an open vessel up to 100° whereupon the greater part of the dioxan evaporates. After cooling to room temperature, continuous extraction with diethyl ether is carried out. On evaporating the diethyl ether, 2,3-pyridinediol is obtained, M.P. 251–253°; yield: 2.92 g. (26% of the theoretical).

In its second aspect, the invention relates to another novel process for the production of 2,3-pyridinediol, and also to novel salts of 3-hydroxy-2-oxo-1(2H)pyridine-sulfonic acid occurring as intermediate in said process. More particularly, such intermediates according to the invention comprise alkali metal and ammonium salts of the aforesaid acid, e.g. the sodium salt, of the formula

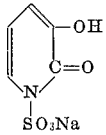

The novel process according to the second aspect of the invention comprises, in a first mode of operation, (A):

(1) Reacting with each other in an aqueous medium, optionally with the addition of a catalyst, (a) furfural,
(b) chlorine or an agent releasing chlorine in an aqueous medium, and
(c) sulfaminic acid, the molar ratio of (a) to (b) ranging from about 1:0 to 2:3, and the pH of the reaction mixture being held, upon addition of (c) thereto, below 2 and preferably below 0.5 and optionally below 0 throughout the remainder of the ensuing reaction thereof with (a) and (b);

(2) Hydrolyzing the reaction mixture by methods described in detail further below, thereby obtaining 2,3-pyridinediol, partially or wholly as its hydrochloride; and (3) Recovering the same from the hydrolyzate, preferably after liberating the pyridinediol from the hydrochoride by at least partial neutralization, e.g. by filtration and/ or by extraction with a substantially water-immiscible solvent therefor, preferably diethyl ether;

Or, according to a second mode of operation, (b):

adding a cation-donating agent capable of dissociating in the reaction mixture with release of alkali-metal cations, in particular sodium ions, in a sufficient excess amount to precipitate, in the reaction mixture, the corresponding alkali metal salt, in particular the sodium salt, of 3-hydroxy-2-oxo-1(2H)-pyridine-sulfonic acid;

recovering the latter by separation from the reaction medium, e.g. by filtration.

In order to ensure precipitation of the last-mentioned alkali metal salt practically free from other byproducts, it is preferable to use in step (1) the pH below 0, and the total volume of the reaction mixture after addition of sulfaminic acid thereto should be less than 10 liters, and preferably only from 1 to 2 liters, calculated on every mole of furfural used as starting material.

The alkali metal 3-hydroxy-2-oxo-1(2H)-pyridinesulfonate and especially the sodium salt according to this aspect of the invention are reactive substances which can be used as intermediate products for the production of many other substances. It has also been found that these salts, and especially the sodium salt can easily be converted into 2,3-pyridinediol by storing them with water at room temperature or heating them with water.

The sodium salt is preferred because it precipitates more readily from the reaction mixture, than, e.g. the potassium salt, the latter being of greater solubility in aqueous media.

The 2,3-pyridinediol can also be obtained from the reaction mixture containing 3-hydroxy-2-oxo-1(2H)-pyridine sulphonic acid without isolating the alkali metal salt, by storing this mixture at room temperature or heating it, optionally after the addition of a substance or mixture of substances providing at least an equimolar content of alkali metal ions, preferably of sodium ions.

Water can serve as reaction medium for the chlorination and reaction with sulfamic acid; with high concentrations of the reaction components it is recommended to use a mixture of water and a solvent which is miscible therewith or easily soluble therein such as, e.g. methanol, ethanol, propanol, isopropanol, tert.butanol, methoxyethanol, ethoxyethanol, n-butoxyethanol, dimethyl formamide, acetic acid or dioxan.

The chlorine can be introduced into the reaction, for example, in the gaseous state or as sodium hydrochlorite. Examples of suitable catalysts for the chlorination are bromides and iodides which are soluble in the reaction medium such as sodium bromide or potassium iodide, or other inorganic compounds such as molybdenum salts which, in this step of the process increase the yields in oxidation with halogen. The chlorination is preferably performed at a pH below 6.

Sulfaminic acid, the amount of which should preferably be 0.5–1.5 mol calculated on the furfural, can be added to the aqueous chlorinated furfural solution either as such or in the form of one of its salts such as the sodium salt, or the potassium salt. The ensuing reaction should be performed in a strongly acid, e.g. in 1 N to 3 N mineral acid medium, care being taken to ensure that the conversion of all chlorine introduced during the chlorination is practically complete.

Preferably, a mixture (a) of free sulfaminic acid and a strong mineral acid, e.g. concentrated hydrochloric acid, is added to the aqueous chlorinated furfural solution (b) containing sufficient cation-donating agent to precipitate the desired end product, the mixture (a) of sulfaminic acid and mineral acid being of sufficient strength to impart to the resulting reaction mixture of (a) and (b) a pH below 0.5 and preferably below 0.

This practically eliminates the possibility of a reaction between sulfaminic acid and chlorinated furfural at a pH above 0.5 or higher, which reaction would lead to the formation of 3-hydroxy-2-imino-1(2H)-pyridine sulfonic acid as byproduct which latter acid is difficult to separate from the desired salt of 3-hydroxy-2-oxo-1(2H)-pyridinesulfonic acid.

The pH desired in any phase of the sequence of reactions according to the invention can be attained by the addition of compounds having a basic or acid reaction, provided that the pH has not already been suitably adjusted by the reaction components and reaction products. Suitable basic compounds are, e.g. hydroxides, carbonates or acetates of the alkali metals or of ammonium ions. Suitable acid compounds are, e.g. hydrochloric acid, sulfuric acid and acid sulfates as well as organic acids such as, e.g. acetic acid. The reaction with chlorine can be performed either before or after the addition of the sulphaminic acid but it is preferably performed beforehand. It is performed below 40° and above the solidification temperature of the reaction mixture, preferably however, between −10° and 10°.

The reaction of sulphaminic acid and the furfural solution which may already have been treated with chlorine is performed within a temperature range which is limited by the crystallization point of the reaction mixture and the boiling point thereof; it is preferably performed, however, between 0° and 20°.

If, after the reaction last mentioned above, it is desired to isolate the sodium salt of 3-hydroxy-2-oxo-1(2H)-pyridine sulphonic acid, at least equimolar amounts of sodium ions must be present in the reaction mixture or be added thereto after the reaction. Suitable agents for donating alkali metal ions are sodium hydroxide or sodium salts such as sodium chloride, sodium sulphate, sodium acetate, sodium sulfamate, sodium carbonate or sodium hydrogen carbonate, and the corresponding potassium compounds. The precipitated sodium 3-hydroxy-2-oxo-1(2H)-pyridine-sulfonate can be recovered by filtration and washing, e.g. with ethanol, in a pure form.

If it is desired to produce 2,3-pyridinediol, either the isolated alkali metal 3-hydroxy-2-oxo-1(2H)-pyridine sulfonate can be stored with water at room temperature or heated for a short time whereupon a quantitative yield of 2,3-pyridinediol is formed, or the above reaction mixture, which optionally, but not necessarily may contain an equimolar amount of alkali metal, e.g. sodium ions, i.e. in which the alkali metal 3-hydroxy-2-oxo-1(2H)-pyridine-sulfonate is present can be stored at room temperature or boiled for a short time. The 2,3-pyridinediol formed is isolated by filtration or by extraction, e.g. with diethyl ether, from the aqueous reaction mixture. Finally, 2,3-pyridinediol can be obtained from the mother liquor from which the sodium salt has been separated by storing or heating the latter and subsequent extraction as described.

Thanks to the novel process of the first and second aspects of the present invention 2,3-pyridinediol, which has hitherto been obtained only with difficulty, has been rendered easily accessible, so that, from an economic point of view also, it is now readily available as starting material for the production of valuable organic compounds. In particular, it can be used as coupling component in the production of novel azo dyes.

The following non-limitative examples illustrate the first aspect of the invention further.

In the following examples illustrating the second aspect of the invention whereover reference is made to numbers of preceding examples, it is to the identified example in connection with this second invention aspect.

EXAMPLE 1

(a) 71.0 g. of chlorine (=42.8 ml. measured at −80°, 1.00 mol) are introduced through a cylindrical sintering glass tube at 0° while stirring well into a suspension of 96.1 g. (1.00 mol) of furfural in 700 ml. of water, the addition being made within 30 minutes. During the reaction, the furfural is dissolved and a slight amount (about 5 g.) of an oily substance separates out simultaneously which clings to the walls of the reaction vessel. 40% sodium hydroxide solution is then added dropwise while stirring at 0° until the pH is 2 (about 200 g., 2.0 mol). The reaction mixture is decanted from the oily precipitate and diluted with water to 1000 ml. If the pale yellow solution cannot be further worked up immediately, it is cooled to about −25° at which temperature it can be stored for about 1 day without any noticeable alteration.

(b) 30.0 g. (0.31 mol) of pulverised sulphaminic acid, 100 ml. of water and 60 ml. of concentrated hydrochloric acid are mixed in a 1 liter flask and the suspension obtained is cooled to −5°. 200 ml. (about 0.20 mol) of a reaction solution according to (a) which has been stored for 4 weeks at −25°, are added all at once and the mixture is vigorous stirred for 1 hour at 10°. After about 5 minutes the sodium salt of 3-hydroxy-2-oxo-1(2H)-pyridine sulphonic acid begins to precipitate and the mixture quickly turns into a thin slurry. 350 ml. of ethanol are added, the suspension is cooled to −10° while stirring and is filtered through a sinter glass filter. The filter residue of white crystals of the sodium salt is washed on the filter (without stirring) with 80 ml. of ethanol and with diethyl ether and then, as a thin layer on paper, it is dried at room temperature. The yield of sodium salt is 19.2 g. (43.% of the theoretical).

If in (b), instead of the stored reaction solution according to (a), a fresh solution is used, then 16.7 g. of pure sodium salt are obtained (37% of the theoretical).

(c) 15.0 g. (0.067 mol) of the sodium salt obtained according to (b) are suspended in 75 ml. of water and the suspension is boiled for 15 minutes. After cooling, 2.75 g. (0.067 mol) of 97.5%, solid sodium hydroxide are added and the suspension of 2,3-pyridinediol obtained is continuously extracted with diethyl ether for about 15 hours. The ethereal suspension is reduced to a volume of about 50 ml. and then filtered whereupon 7.56 g. of 2,3-pyridinediol are obtained. M.P. 253–254° (in evacuated tube, Hersberg apparatus, corrected). The yield is 100%, calculated on the sodium salt of 3-hydroxy-2-oxo-1(2H)-pyridine sulphonic acid, and 43% calculated on the furfural.

(d) Further 2,3-pyridinediol (about 1.75 g., corresponding to 10% of the theoretical) can be obtained from the mother liquor formed according to (b) of the sodium salt of 3-hydroxy-2-oxo-1(2H)-pyridine sulphonic acid by boiling it, cooling and continuously extracting it with diethyl ether analogously to (c).

Similar results are obtained when using in step (a) 40% potassium hydroxide solution. However, the yield of potassium 3-hydroxy-2-oxo-1(2H)-pyridine sulfonic acid obtained at the end of step (b) is somewhat lower due to the greater solubility of the potassium salt in the reaction liquor.

EXAMPLE 2

30 ml. of concentrated hydrochloric acid are added to 100 ml. (about 0.10 mol) of a reaction solution prepared according to Example 1(a) and 15.0 g. (0.15 mol) of pulverized sulphaminic acid are added while stirring at 2°. After stirring for about 5 minutes, this mixture turns into a thick slurry as a voluminous precipitate of the sodium salt of 3-hydroxy-2-oxo-1(2H)-pyridine sulphonic acid is formed. It is stirred for, in all, 30 minutes at 2°, then the mixture is heated for 10 minutes at 100° whereupon it is converted into a very dark, clear solution. After cooling, the pH of the mixture is adjusted to 4.5 by the addition of 40% sodium hydroxide solution and it is continuously extracted with diethyl ether. Impure 2,3-pyridinediol is obtained. By dissolving this in 250 ml. of methanol, decolouring the solution with active charcoal, concentrating the solution to about 40 ml., cooling the filtering, 3.36 g. of 2,3-pyridinediol are obtained (30% of the theoretical); M.P. 249–252°.

EXAMPLE 3

19.2 g. (0.20 mol) of furfural and 30.0 g. (0.29 mol) of sulphaminic acid are dissolved at 0° in a mixture of 240 ml. of water and 60 ml. of concentrated hydrochloric acid. 14.2 g. (0.20 mol) of chlorine are added within 30 minutes at 0° while stirring, the acidity of the solution (3 N hydrochloric acid) being kept constant by the addition of 40% sodium hydroxide solution (automatically under electrometric control). The reaction mixture is then stirred for 1 hour at 10°. The precipitated sodium salt of 3-hydroxy-2-oxo-1(2H)-pyridine sulphonic acid is filtered, washed with ethanol and with ether and dried; yield: 2.80 g. (6.5% of the theoretical). The salt can be converted quantitatively into 2,3-pyridinediol as described in Example 1(c). The mother liquor of the sodium salt is refluxed for 5 minutes, the pH adjusted to 4.5 with 40% sodium hydroxide solution and then continuously extracted with diethyl ether whereupon 2,90 g. (13% of the theoretical) of 2,3-pyridinediol is obtained.

EXAMPLE 4

63 ml. of sodium hypochlorite solution (containing 11.2 g. of active chlorine per 100 ml.)/(0.10 mol) are added dropwise within 10 minutes at 0° while stirring to a solution of 9.6 g. of furfural (0.10 mol) in 15 ml. of tert. butyl alcohol and 30 ml. of 3 N hydrochloric acid. After a few minutes, 13 g. of sulphaminic acid (0.13 mol) and 10 ml. of concentrated hydrochloric acid are added and the reaction mixture is heated for 15 minutes at 100° whereupon the greater part of the butyl alcohol is distilled. After cooling to room temperature, the pH of the reaction mixture is brought to 4 by the addition of sodium hydroxide solution and the reaction mixture is continuously extracted with diethyl ether. On evaporating the diethyl ether and recrystallising the residue from methanol, 3.50 g. (32% of the theoretical) of 2,3-pyridinediol, are obtained; M.P. 244–247°.

EXAMPLE 5

15 g. of chlorine (0.21 mol) are introduced within 35 minutes while stirring vigorously at 0° into a solution of 19 g. of furfural (0.20 mol) and 1. g. of sodium bromide in 60 ml. of water and 30 ml. of acetic acid, the pH being kept at 1 by the addition of, in all, 33 g. of sodium acetate (0.40 mol). 200 ml. of water, 60 ml. of concentrated hydrochloric acid and 29 g. of sulphaminic acid (0.3 mol) are added to the reaction mixture at 10° and the mixture is stirred for 70 minutes at 10°. After cooling to 0° and adding 200 ml. of ethanol, the precipitated sodium salt of 3-hydroxy-2-oxo-1(2H)-pyridine sulphonic acid is filtered, washed with 80 ml. of ethanol and then with diethyl ether and dried in the air; yield: 15.3 g. (34% of the theoretical).

EXAMPLE 6

14 g. of chlorine (0.20 mol) are introduced at 0° while stirring vigorously into a suspension of 19 g. of furfural (0.20 mol) in 170 ml. of water. After adding 19 g. of sulphaminic acid (0.20 mol), the temperature of the reaction mixture is raised to 25° for 3 minutes whereupon the sulphaminic acid dissolves and reacts with the oxidation product. The solution is cooled to 10° for 3 minutes and the sodium salt of the 3-hydroxy-2-oxo-1(2H)-pyridine sulphonic acid is precipitated by the addition of a solution of 23 g. of sodium chloride (0.39 mol) in 180 ml. of water. After the addition of 350 ml. of ethanol and cooling to −10°, the sodium salt of 3-hydroxy-2-oxo-1(2H)-pyridine sulphonic acid is filtered, washed with 80 ml. of ethanol and then with diethyl ether and dried in the air. The yield is 12.8 g. (29% of the theoretical).

EXAMPLE 7

63 ml. of sodium hypochlorite solution (containing 11.2 g. of active chlorine per 100 ml). (0.10 mol) are added dropwise within 15 minutes at 0° while stirring to a solution of 9.6 g. of furfural (0.10 mol) and 0.5 g. of potassium iodide in 150 ml. of 1 N hydrochloric acid. After standing for 10 minutes, about 1.5 g. of sodium thiosulphate are added to decompose traces of active halogen. 25 ml. of concentrated hydrochloric acid, 6 g. of sodium chloride (0.10 mol) and 15 g. of sulphaminic acid (0.15 mol) are added at 10° and the mixture is stirred for 70 minutes at 10°. After adding 350 ml. of ethanol and cooling to 10°, the sodium salt of 3-hydroxy-2-oxo-1(2H)-pyridine sulphonic acid formed is filtered, washed with 80 ml. of ethanol and then with diethyl ether and dried in the air. The yield is 9.6 g. (43% of the theoretical).

EXAMPLE 8

14 g. of chlorine (0.20 mol) are introduced at 0° while stirring vigorously into a suspension of 19 g. of furfural (0.20 mol) in 170 ml. of water. After adding 19 g. of sulfaminic acid (0.20 mol), the temperature of the reaction mixture is raised to 20° for 3 minutes whereupon the sulfaminic acid dissolves and reacts with the oxidation product.

The mixture then is heated for 10 minutes at 100° whereupon it is converted into a very dark, clear solution. After cooling, the pH of the mixture which contains 2,3-pyridinediol dissolved as hydrochloride is adjusted to 3 by the addition of 40% sodium hydroxide solution and it is continuously extracted with diethyl ether. Impure 2,3-pyridinediol is obtained. By dissolving this in 250 ml. of methanol, decoloring the solution with active charcoal, concentrating the solution to about 40 ml., cooling the filtering, 3.36 g. of 2,3-pyridinediol are obtained (30% of the theoretical); M.P. 249–252°.

In its third aspect the present invention relates to a novel process for the production of the hitherto unknown monohydrate of 3-hydroxy-2-imino-1(2H)-pyridine sulphonic acid, and also of 2-amino-3-pyridinol.

In the description of this third aspect of the invention given below, where reference is made to preceding numbers of formulas or examples, it is to the identified formula or examples in connection with this third invention aspect.

It has surprisingly been found that the monohydrate of 3-hydroxy-2-imino-1(2H)-pyridine-sulphonic acid, which compound has not been known up to the present, is obtained from easily accessible starting materials in satisfactory yield rates and substantially free from 3-hydroxy-2-oxo-1(2H)-pyridine derivatives from which it would be very difficult to separate, by the process according to this third aspect of the invention, which comprises:

(a) Reacting furfural in an aqueous medium, optionally with the addition of catalysts with chlorine or a compound giving off chlorine, the molar ratio of the components being in the range of from 1:1 to 1:1.5;

(b) Reacting the resulting reaction mixture the pH of which has preferably been adjusted to about 1 to 2, by the means described further below, with sulfaminic acid, and adjusting the pH of the reaction mixture to above 0.5 and below 6, and preferably to about 1 to 3, maintaining the pH of the reaction mixture by the addition of an alkaline agent either to one of the starting materials, or, immediately upon admixing the chlorine-treated furfural solution and the sulfaminic acid with each other, so that only for a few seconds the pH of the mixture is outside the above-defined range, and then, preferably, adding a sufficient amount of a strong mineral acid to adjust the pH value to within the preferred range between about 1 and 3; and (c) Isolating the precipitated 3-hydroxy-2-imino-1 (2H)-pyridine-sulfonic acid monohydrate.

In order to facilitate providing the desired pH of the reaction mixture during the short interval mentioned above under (b), it is preferred to add a neutral aqueous solution of a water-soluble salt, e.g. an alkali metal or ammonium salt of sulfaminic acid, rather than the free acid, to the aqueous chlorinated furfural solution. It is thus possible to essentially reduce the formation of the undesirable 3-hydroxy-2-oxo-1(2H)-pyridine sulfonic acid as byproduct, which would occur if the reaction medium immediately at admixture of the reactions would be too acid.

A small portion of this byproduct which precipitates in the form of the sodium salt together with the desired 3-hydroxy-2-imino-1(2H)-pyridine-sulfonic acid monohydrate, is eliminated by washing the latter with water in which the latter is considerably less soluble.

The monohydrate of 3 - hydroxy-2-imino-1(2H)-pyridine sulfonic acid according to the invention, is a reactive substance which is useful as an intermediate; e.g. it can easily be converted into 2-amino-3-pyridinol by storing it at room temperature or heating it, either per se or with water. The 2-amino-3-pyridinol can also be obtained from the reaction mixture containing the 3-hydroxy-2-imino-1(2H)-pyridine sulfonic acid without isolating the monohydrate, by storing this mixture at room temperature or heating it and then isolating the 2-amino-3-pyridinol formed.

Water can be used as reaction medium for the chlorination and reaction with sulphaminic acid. When there are high concentrations of reaction components, it is recommended that a mixture of water and a water miscible solvent or one which easily dissolves in water be used such as, e.g. methanol, ethanol, propanol, isopropanol, tert. butanol, methoxyethanol, ethoxyethanol, n-butoxyethanol, dimethyl formamide, acetic acid or dioxan.

The chlorine can be added, e.g. in the gaseous state or as sodium hypochlorite. Examples of suitable catalysts for the chlorination are bromides and iodides which are soluble in the reaction mixture such as sodium bromide or potassium iodide, also other inorganic compounds such as molybdenum salts which experience has shown can increase the yields in oxidations with halogen. The chlorination is preferably performed at a pH under 6, and preferably below 2.

Sulphaminic acid, the amount of which should preferably be 1.0–3.0 mol calculated on the furfurol, can be added as such or in the form of one of its salts such as the sodium salt or the ammonium salt, to the aqueous furfurol solution which has been treated with chlorine. The reaction is preferably performed in a weakly acid medium, e.g. in 0.001–0.3 N mineral acid solution.

The pH value desired in every phase of the sequence of reactions according to the invention can be attained by the addition of compounds having a basic or acid reaction, provided it has not been adjusted already in a suitable manner by the reaction components and reaction products. Suitable basic compounds are, for example, hydroxides, carbonates or acetates of the alakli metals or of the ammonium ion. Suitable acid compounds are, for example, hydrochloric acid, sulphuric acid and acid sulphates as well as organic acids such as, e.g. acetic acid.

The reaction of furfural and chlorine is performed below 40° and above the crystallisation temperature of the reaction mixture, preferably, however, it is performed between $-10°$ and $10°$.

The reaction of sulphaminic acid and the furfural solution which has been treated with chlorine is performed within a temperature range which is limited by the crystallisation point of the reaction mixture and the boiling point thereof, it is preferably performed, however, between 0° and 20°.

If it is desired, in this latter reaction, to isolate the monohydrate of 3-hydroxy-2-imino-1(2H)-pyridine sulphonic acid, this is done simply by filtering off. If the 2-amino-3-pyridinol is to be obtained, either the isolated monohydrate, either as such or with water, can be stored or heated for a short time whereupon a quantitative yield of 2-amino-3-pyridinol is formed as sulphuric acid salt, or the above reaction mixture can simply be stored or boiled for a short time. In both cases, the 2-amino-3-pyridinol formed is liberated by the addition of an acid binding agent, e.g. concentrated sodium hydroxide solution, and filtered, or it is isolated by extraction, e.g. with diethyl ether, of the aqueous reaction mixture which has been made weakly alkaline.

Due to the present invention, 2-amino-3-pyridinol, which previously could only be obtained with difficulty, has become easily accessible so that it is now, also from an economic point of view, an excellent starting material for the production of valuable organic compounds. For instance, it is useful as a coupling component in the production of azo dyestuffs.

The following non-limitative examples illustrate the third aspect of the invention further.

EXAMPLE 1

(a) 71.0 g. of chlorine (=42.8 ml., measured at $-80°$, 1.00 mol) are introduced through a sintering glass tube at 0° while stirring well into a suspension of 96.1 g. (1.00 mol) of furfural in 700 ml. of water, the addition being made within 30 minutes. The furfural dissolves during the reaction and at the same time a slight amount (about 5 g.) of an oily substance separates and clings to the walls of the reaction vessel. 40% sodium hydroxide solution is then added dropwise at 0° until a pH of 2 is attained (about 200 g., 2.0 mol). The reaction mixture is decanted from the oily precipitate and diluted with water to 1000 ml. If the pale yellow solution cannot be worked up immediately, it is cooled to about $-25°$, at which temperature it can be stored for about 1 day without any noticeable change.

(b) A solution of sodium sulphamate is produced by dissolving 194 g. (2.00 mol) of sulphaminic acid in the mixture of 500 ml. of water and 200 g. of 40% sodium hydroxide solution. 1000 ml. of the reaction solution freshly prepared according to (a) are poured in at once at 10°. 50 ml. of 3 N hydrochloric acid are then added and the clear, pale yellowish solution is stirred at 10°. An almost white powder begins to precipitate after about 15 minutes. After 3 hours, the precipitate, the monohydrate of 3-hydroxy-2-imino-1(2H) - pyridine sulphonic acid, is filtered, and washed twice with 150 ml. of water each time. The moist filter residue, which weights about 100–110 g., is refluxed for 5 minutes with 100 ml. of water and then cooled to room temperature. Another 50 ml. of water are added and the pH of the clear, brown solution is adjusted to pH 8 by the addition of 40% sodium hydroxide solution (about 65 g.). The mixture thickens into a crystal mass. This is continuously extracted with diethyl ether (in a 400 ml. Kutscher Steudel apparatus with magnetic stirrer and 250 ml. flask in which there are 150 ml. of diethyl ether). Filtration of the ethereal crystal suspension obtained yields 32.8 g. (30% of the theoretical) of 2-amino-3-pyridinol which melts at 172–174° (in evacuated tube, Hershberg. apparatus., corrected). In the region of the melting temperature, polymorphous changes appear to take place. The substance was identified spectroscopically (IR in KBr) by comparison with a sample produced by reduction of 2-nitro-3-pyridinol according to T. Takahashi and F. Yoneda, Pharm. Bull. (Tokyo) 5, 350 (1957).

EXAMPLE 2

(a) 100 ml. of a reaction solution prepared according to example (1a) are added all at once to a solution of 19.4 g. (0.20 mol) of sulphaminic acid and 20 g. of 40% sodium hydroxide solution in 50 ml. of water and then 5 ml. of 3 N hydrochloric acid are added and the solution formed is stirred for 3 hours at 10°. The precipitate, the monohydrate of 3-hydroxy-2-imino-1(2H)-pyridine sulphonic acid, is filtered, washed twice with 15 ml. of water each time, twice with 10 ml. of methanol each time and finally with ether and it is then dried at room temperature under 1 mm. pressure. 6.45 g. (31% of the theoretical) of the above hydrate are obtained as fine, almost white crystals. The hydrate is almost insoluble in water and in organic solvents. Depending on type of heating it melts at 70–90°. At about 10–20° higher the melt again becomes solid due to the formation of 2-amino-3-pyridinol sulphate which, in its turn, melts at 124–125°. The hydrate has a blue reaction to ferric chloride.

On working quickly and carefully the hydrate can be crystallised from water (1 g. to 50 ml. of water) in 85% yield. The crystallised product is white and gives one single spot in the thin layer chromatogram ("Kieselgel G" in methanol). After standing for 4 days at room temperature, according to the chromatogram the hydrate has partly changed into 2-amino-3-pyridinol and sulphuric acid, i.e. into the 2-amino-3-pyridinol monosulphate respectively.

To form the sodium salt, 3.40 g. (0.0163 mol) of the above hydrate are combined with 0.670 g. (0.163 mol) of sodium hydroxide and 10 ml. of water to form an almost clear, pale yellowish solution. This is filtered dust-free and evaporated to dryness on a water bath at 100° under 15 mm. pressure. The sodium salt of 3-hydroxy-2-imino-1(2H)-pyridine sulphonic acid is obtained in a yield of 3.43 g. as a grey-white powder. It contains 3.5% of water; the yield therefore amounts to 96% of the theoretical. The substance is stable to refluxing for 20 minutes with 1 N sodium hydroxide solution. No precipitate is formed with barium chloride.

2,3-pyridinediol is obtained, when adding 40 ml. of concentrated hydrochloric acid to the mother liquor of the hydrate formed according to the first paragraph, refluxing the whole, cooling and buffering the pH to 4.5 with sodium hydroxide and finally continuously extracting with diethyl ether.

EXAMPLE 3

58 ml. of sodium hypochlorite solution (containing 12.2 g. of active chlorine per 100 ml.) (0.10 mol) are added dropwise at 0° while stirring to a solution of 9.6 g. of furfural (0.10 mol) in 150 ml. of 1 N hydrochloric acid, the addition being made within 10 minutes. After standing for 5 minutes, 7 ml. of 40% sodium hydroxide solution and then 22 g. of ammonium sulphamate (0.19 mol) are added. The temperature is brought to 10° and the pH is adjusted to 1.7 with a little sodium hydroxide solution. After 3 hours, the precipitated 3-hydroxy-2-imino-1(2H)-pyridine sulphonic acid monohydrate is filtered and washed and dried as described in Example 2. The yield is 6.1 g. (29% of the theoretical).

EXAMPLE 4

86 g. of chlorine (1.21 mol) are introduced at 0° while stirring vigorously into a solution of 10 ml. of furfural, 10 g. of sodium bromide and 3 ml. of concentrated hydrochloric acid in 300 ml. of water. The pH of the reaction mixture is kept at 1 by the addition of 40% sodium hydroxide solution, and simultaneously 1 ml. of furfural is added for each milliliter of sodium hydroxide solution until a total of 100 ml. of furfural (116 g., 1.21 mol) have been added. On completion of the introduction of chlorine, a solution of 200 g. of sulphaminic acid (2.03 mol) in 200 ml. of water and 120 ml. of 40% sodium hydroxide solution is added. The temperature is brought to 10° and the pH adjusted to 1.0 by the addition of concentrated hydrochloric acid. After 2 hours, the precipitate formed which consists of a mixture of sodium-3-hydroxy-2-oxo-1(2H)-pyridine-sulfonate and the monohydrate of 3-hydroxy-2-imino-1(2H)-pyridine-sulfonic acid, is filtered and refluxed for 15 minutes with 350 ml. of water. The resultant acid solution, the pH of which is about 0.5, is cooled and then continuously extracted for 12 hours with chloric acid in 300 ml. of water. The pH of the reaction diethyl ether. 5 g. (4% of the theoretical) of 2,3-pyridinediol crystallizes from the diethyl ether. It melts at 246–253° (in evacuated tube).

After the extraction with diethyl ether, the acid solution is adjusted to pH 8 by the addition of solid sodium hydroxide and again extracted for 12 hours with diethyl ether. 34 g. (26% of the theoretical) of 2-amino-3-pyridinol crystallite from the diethyl ether.

EXAMPLE 5

15 g. of chlorine (0.21 mol) are introduced at 0° into a solution of 19 g. of furfural (0.20 mol) and 5 g. of potassium bromide in 100 ml. of water and 25 ml. of acetic acid, the introduction being made within 30 minutes while stirring vigorously. The pH is kept at 1 by the addition of potassium acetate. After 10 minutes, 45 g. of ammonium sulphamate (0.40 mol) are added to the reaction mixture and dissolved by stirring at 10°. The pH of the solution is adjusted to 1.70 by the addition of concentrated hydrochloric acid and the mixture is stirred for 2 hours at 10°. The precipitate formed, the monohydrate of 3-hydroxy-2-imino-1(2H)-pyridine sulphonic acid, is filtered, washed with 60 ml. of water and converted into 2-amino-3-pyridinol as described in Example 1 by boiling with water. The yield is 9.2 g. (41% of the theoretical).

EXAMPLE 6

3.3 g. of ethyl p-aminobenzoate are diazotized in a conventional manner with sodium nitrite in diluted hydrochloric acid at 0 to 1°. The diazonium salt solution is buffered with sodium acetate, and is then added with stirring to a solution of 2.3 g. of 2,3-di-hydroxy-pyridine in 50 ml. of water. The resulting mixture is cooled to maintain a temperature of about 0 to 5° and its pH is adjusted to about 8 to 9. After termination of coupling acetic acid is added to the reaction mixture until it shows acid reaction upon testing with litmus paper. Thereupon, the corresponding monoazo dyestuff precipitates. The dyestuff is then separated by filtration and dried.

Cellulose acetate fibers are dyed from an aqueous dispersion with this product in yellow shades.

EXAMPLE 7

2.5 g. of p-chloroaniline are diazotized in a conventional manner as described in the preceding example. The aqueous diazonium salt solution is added dropwise to a mixture of 1.9 g. of 2-amino-3-hydroxy-pyridine with 50 ml. of water, and, while cooling the mixture well to about 0 to 5°, the pH of the resulting mixture is increased until it is about 8 to 9, by adding dropwise aqueous sodium carbonate solution. After the coupling reaction has terminated, the reaction mixture is acidified by adding acetic acid to attain acid reaction on litmus paper, whereupon the dyestuff precipitates. It is then separated by filtration and dried, and represents a brown powder which dyes cellulose acetate fiber from an aqueous dispersion in brownish yellow shades.

We claim:
1. An alkali metal salt of 3-hydroxy-2-oxo-1(2H)-pyridine-sulfonic acid.
2. Sodium 3-hydroxy-2-oxo-1(2H)-pyridine-sulfonate.
3. 3-hydroxy-2-imino-1(2H) - pyridine - sulfonic acid monohydrate.

References Cited

UNITED STATES PATENTS 3,284,292   11/1966   Scherer et al. _____ 167—30

HENRY R. JILES, Primary Examiner

G. T. TODD, Assistant Examiner